United States Patent
Raskin

(10) Patent No.: US 11,010,475 B1
(45) Date of Patent: May 18, 2021

(54) SECURE COMPUTER WITH MULTIPLE OPERATING SYSTEMS

(71) Applicant: JANUS TECHNOLOGIES, INC., Half Moon Bay, CA (US)

(72) Inventor: Sofin Raskin, Los Altos, CA (US)

(73) Assignee: Janus Technologies Inc., Half Moon Bay, CA (US)

( * ) Notice: Subject to any disclaimer, the term of this patent is extended or adjusted under 35 U.S.C. 154(b) by 179 days.

(21) Appl. No.: 15/727,524

(22) Filed: Oct. 6, 2017

Related U.S. Application Data

(60) Provisional application No. 62/405,660, filed on Oct. 7, 2016.

(51) Int. Cl.
| | |
|---|---|
| *G06F 21/57* | (2013.01) |
| *H04L 29/06* | (2006.01) |
| *G06F 9/445* | (2018.01) |
| *G06F 21/53* | (2013.01) |
| *G06F 9/4401* | (2018.01) |

(52) U.S. Cl.
CPC ............ *G06F 21/57* (2013.01); *G06F 21/575* (2013.01); *G06F 9/441* (2013.01); *G06F 9/445* (2013.01); *G06F 9/4406* (2013.01); *G06F 21/53* (2013.01); *G06F 21/572* (2013.01); *H04L 63/02* (2013.01); *H04L 63/105* (2013.01)

(58) Field of Classification Search
CPC .... G06F 21/575; G06F 9/4406; G06F 21/572; G06F 9/441; G06F 21/53; G06F 21/57; G06F 9/445; H04L 63/02; H04L 63/105
USPC .......................................... 713/1, 2; 726/2, 3
See application file for complete search history.

(56) References Cited

U.S. PATENT DOCUMENTS

| | | | |
|---|---|---|---|
| 6,578,140 B1 * | 6/2003 | Policard | G06F 21/567 709/224 |
| 8,393,000 B2 * | 3/2013 | Morgan | G06F 21/53 713/153 |
| 8,813,218 B2 | 8/2014 | Wang et al. | |
| 9,076,003 B2 | 7/2015 | Raskin et al. | |
| 9,215,250 B2 | 12/2015 | Porten et al. | |
| 9,231,921 B2 | 1/2016 | Raskin et al. | |
| 9,232,176 B2 | 1/2016 | Porten et al. | |
| 9,342,711 B2 | 5/2016 | Wang et al. | |
| 9,384,150 B2 | 7/2016 | Raskin et al. | |
| 9,424,443 B2 | 8/2016 | Wang et al. | |
| 9,684,805 B2 | 6/2017 | Raskin et al. | |
| 2003/0115443 A1 * | 6/2003 | Cepulis | G06F 9/4406 713/2 |
| 2007/0074208 A1 * | 3/2007 | Ling | G06F 9/45558 718/1 |

(Continued)

OTHER PUBLICATIONS

U.S. Appl. No. 14/846,768, filed Sep. 5, 2015, Raskin, Sofin.
U.S. Appl. No. 15/059,077, filed Mar. 2, 2016, Raskin, Sofin.

*Primary Examiner* — Ji H Bae
(74) *Attorney, Agent, or Firm* — Foley & Lardner LLP

(57) ABSTRACT

According to certain general aspects, the present embodiments relate to providing a secure computer architecture in which a single computer is capable of simultaneously executing two operating systems. According to certain additional aspects, the two operating systems can have different security profiles and capabilities. According to still further aspects, the secure computer architecture further provides secure video conferencing capabilities, network activity monitoring and high performance computer graphics.

20 Claims, 8 Drawing Sheets

(56) References Cited

U.S. PATENT DOCUMENTS

| | | | |
|---|---|---|---|
| 2007/0118575 A1* | 5/2007 | Kanda | G06F 21/53 |
| 2008/0010446 A1* | 1/2008 | Kim | G06F 9/441 |
| | | | 713/2 |
| 2012/0222114 A1* | 8/2012 | Shanbhogue | G06F 21/53 |
| | | | 726/22 |
| 2013/0227270 A1* | 8/2013 | Ting | G06F 9/4411 |
| | | | 713/100 |
| 2014/0137101 A1* | 5/2014 | Chan | H04L 67/34 |
| | | | 717/176 |
| 2014/0337610 A1* | 11/2014 | Kawano | G06F 9/441 |
| | | | 713/2 |
| 2015/0058975 A1 | 2/2015 | Raskin et al. | |
| 2018/0032733 A1* | 2/2018 | Surdu | G06F 21/53 |
| 2018/0095900 A1* | 4/2018 | Sarangdhar | G06F 12/1425 |
| 2018/0239896 A1* | 8/2018 | Kato | G06F 12/14 |

* cited by examiner

SECURE COMPUTER WITH MULTIPLE OPERATING SYSTEMS

CROSS-REFERENCE TO RELATED APPLICATIONS

The present application claims priority to U.S. Provisional Patent Application No. 62/405,660, filed Oct. 7, 2016, the contents of which are incorporated herein by reference in their entirety.

TECHNICAL FIELD

The present embodiments relate generally to computer security and more particularly to a secure computer capable of simultaneously executing two or more operating systems having separate security profiles and capabilities.

BACKGROUND

The security capabilities and advantages provided by U.S. Pat. Nos. 8,813,218, 9,342,711, 9,215,250, 9,076,003, 9,424,443, 9,384,150, 9,231,921, 9,232,176, 9,684,805, and pending application Ser. Nos. 13/971,604, 14/846,768 and 15/059,077, the contents of which are incorporated by reference herein in their entirety, have dramatically advanced the state of the art. However, opportunities for further advances remain.

SUMMARY

According to certain general aspects, the present embodiments relate to providing a secure computer architecture in which a single computer is capable of simultaneously executing two or more operating systems. According to certain additional aspects, the two or more operating systems can be configured with different security profiles and capabilities. According to still further aspects, the secure computer architecture further provides secure video conferencing capabilities, network activity monitoring and high performance computer graphics.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION

Figure 1:
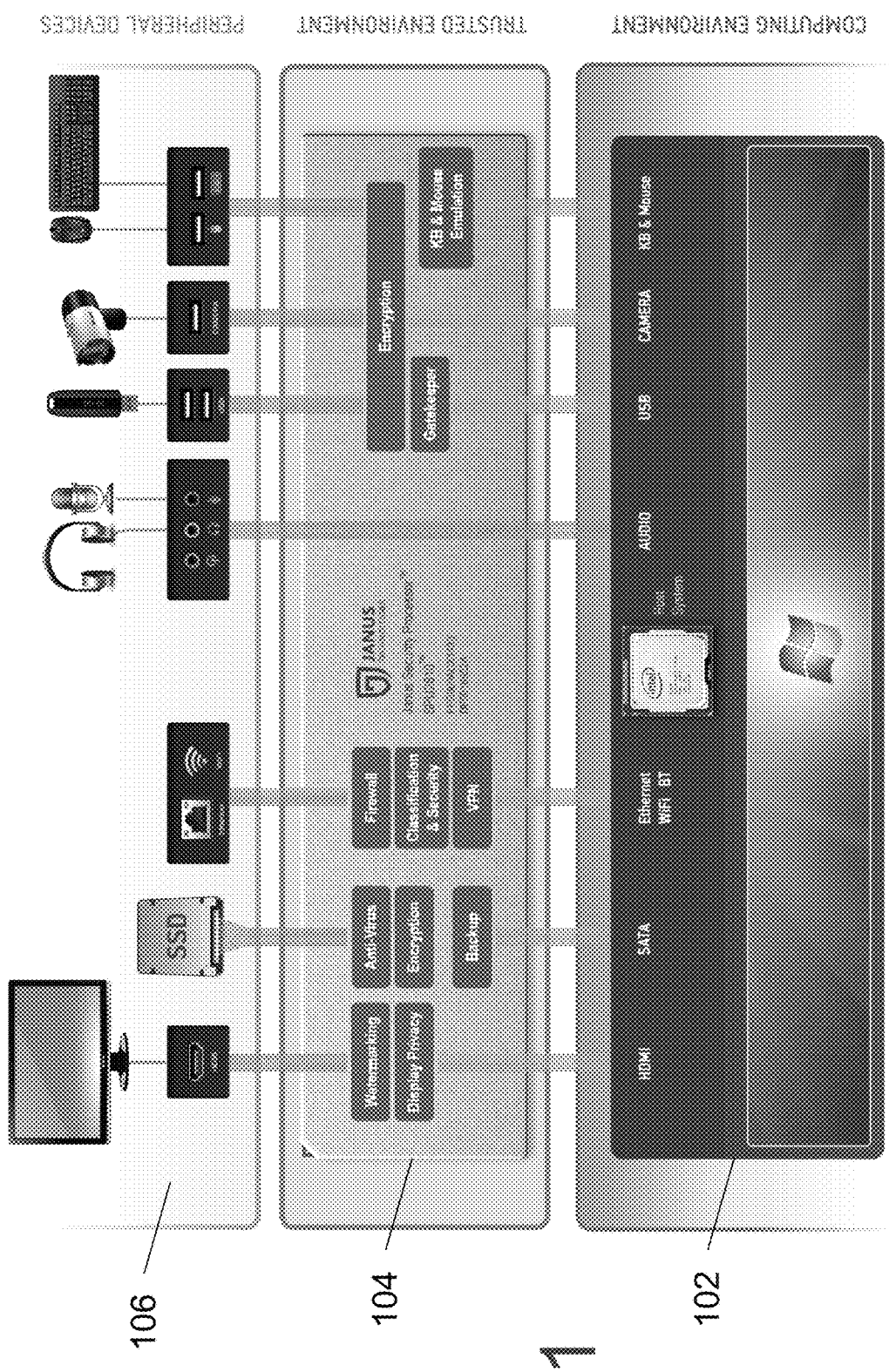
FIG. 1 is a block diagram illustrating some aspects of the security capabilities and advantages provided by U.S. Pat. Nos. 8,813,218, 9,342,711, 9,215,250, 9,076,003, 9,424, 443, 9,384,150, 9,231,921, 9,232,176 and 9,684,805, and pending application Ser. Nos. 13/971,604, 14/846,768 and 15/059,077.

The present embodiments will now be described in detail with reference to the drawings, which are provided as illustrative examples of some embodiments so as to enable those skilled in the art to practice these and other embodiments. Notably, the figures and examples below are not meant to limit the scope of the present disclosure to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

According to certain general aspects, the present embodiments relate to providing a secure computer architecture in which a single computer system is capable of simultaneously executing two or more operating systems. According to certain additional aspects, the two or more operating systems can have different security profiles and capabilities. According to still further aspects, the secure computer architecture further provides secure video conferencing capabilities, network activity monitoring and high performance computer graphics.

According to certain other general aspects, the different operating systems provided by a computer system according to the embodiments can either be instances of the same operating system or they can be different operating systems. Moreover, the two operating systems can be any operating system such as different versions of Windows, Unix, Linux, etc. These and other embodiments of the invention allow for legacy operating systems such as old versions of Windows to execute on modern hardware, due to the nature of the secure BIOS of the present embodiments, as will be described in more detail below. Although the present embodiments will be described in more detail below in connection with one specific possible example of using two operating systems, those skilled in the art will be able to readily extend the principles of the present disclosure to other embodiments including three or more operating systems after being taught by these examples.

FIG. 1 is a block diagram illustrating some aspects of the security capabilities and advantages provided by U.S. Pat. Nos. 8,813,218, 9,342,711, 9,215,250, 9,076,003, 9,424,443, 9,384,150, 9,231,921, 9,232,176 and 9,684,805, and pending application Ser. Nos. 13/971,604, 14/846,768 and 15/059,077, the contents of which are incorporated by reference herein in their entirety. As shown, a secure computer 100 according to these patents and applications includes a host system 102 (e.g. including a conventional x86 processor) executing a conventional operating system such as Windows. The secure computer further includes a secure processor system 104 interposed between the host system 102 and peripherals 106 such as a display, a solid state disk (SSD) or other disk drives, wired and wireless network adapters, audio inputs and outputs, USB jacks, video inputs (e.g. webcam) and keyboard/mouse. As further shown, the secure processor system 104 provides security functionalities such as display watermarking and display privacy, SSD anti-virus protection, encryption/decryption and backups, network firewall, classification and security and VPN, USB/video/keyboard/mouse encryption/decryption, external device gatekeeping, and keyboard/mouse emulation.

Figure 2:
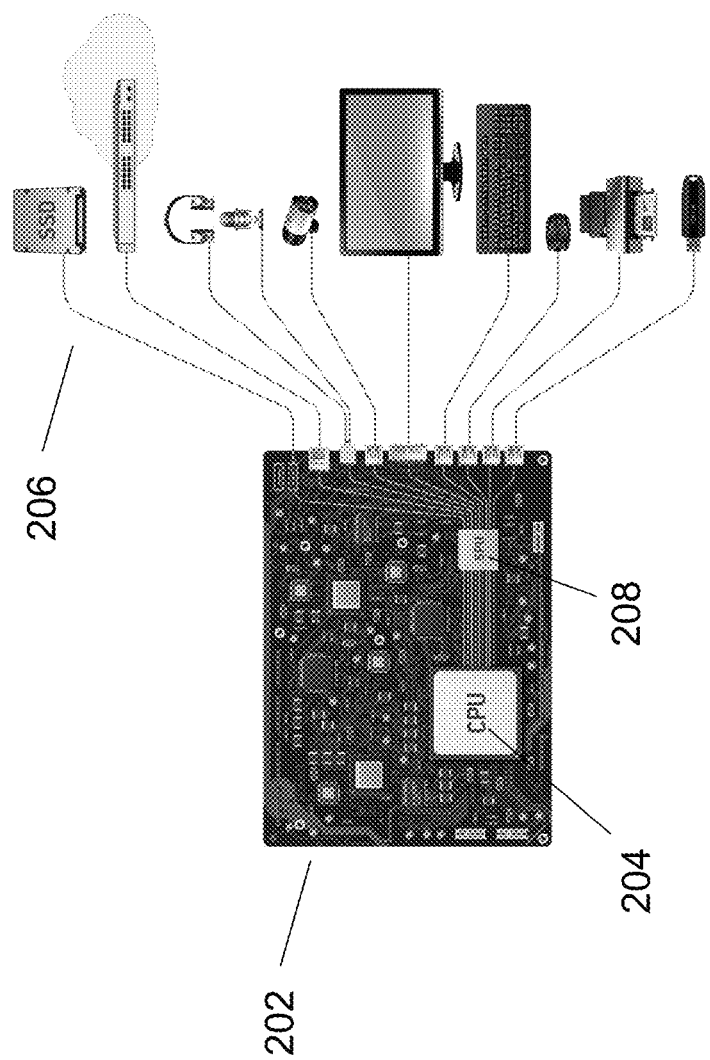
FIG. 2 is a block diagram illustrating additional aspects of a secure computer according the afore-mentioned patents and applications.

FIG. 2 is a block diagram illustrating additional aspects of a secure computer according the afore-mentioned patents and applications. As shown, much like a conventional desktop or notebook computer the secure computer includes a motherboard 202 on which is mounted a host processor CPU 204, as well as connections for peripherals 206 such as a display, a SSD or other drives, wired and wireless network adapters, audio inputs and outputs, USB jacks, video inputs (e.g. webcam), printers and keyboard/mouse. According to certain aspects, the host processor CPU does not have any direct connections to these peripherals. Rather, they are directly connected to a secure processor 208 (i.e. SPU), such that any communications between the host processor CPU 204 and the peripherals 206 are secured by the SPU 208.

Figure 3:
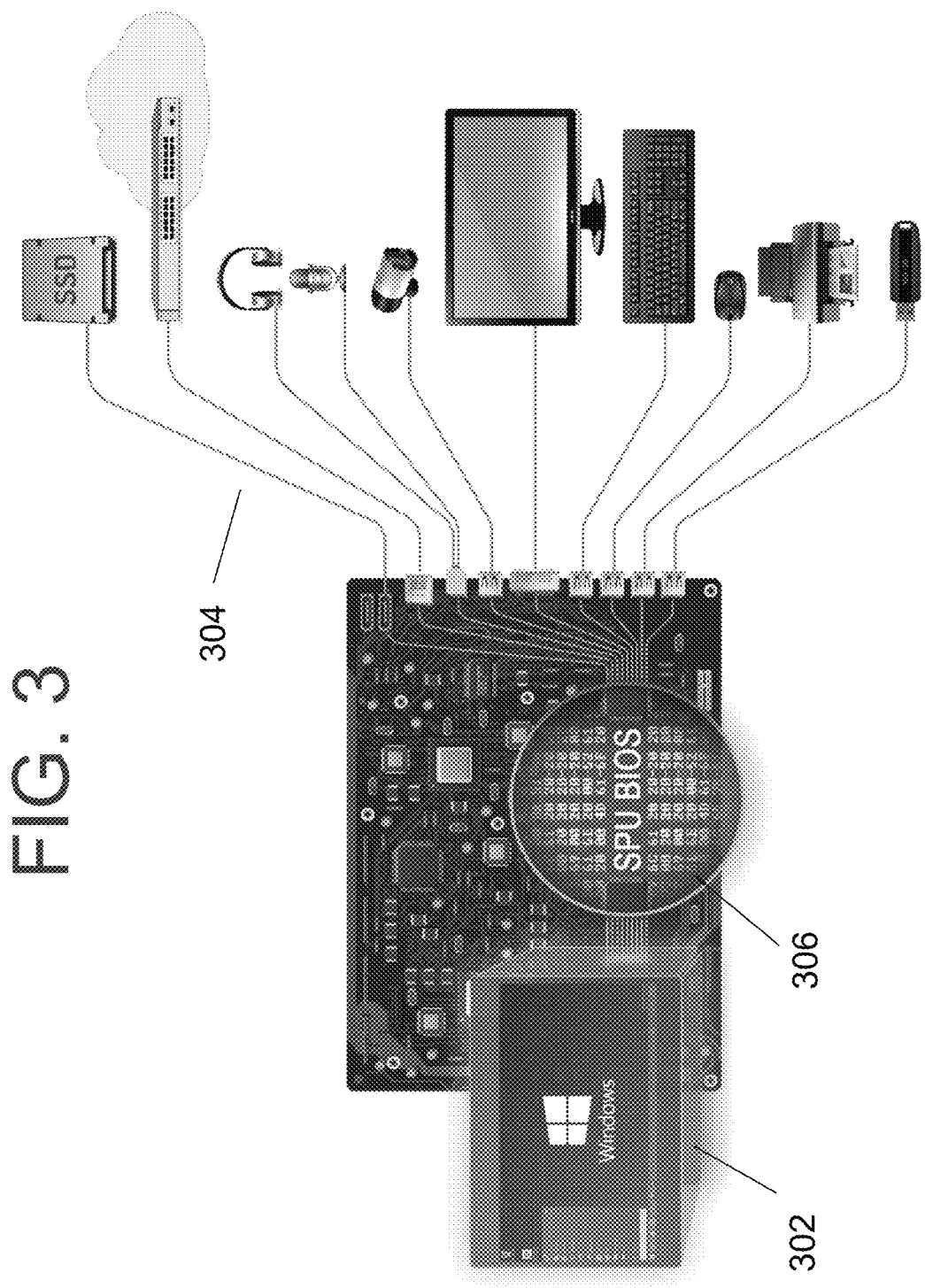
FIG. 3 is a block diagram illustrating aspects of a secure computer according to the present embodiments.

FIG. 3 is a block diagram illustrating even still further aspects of a secure computer according to the present embodiments. As shown, in a secure computer having a host processor executing an operating system such as Windows, the operating system 302 does not have direct access to peripherals 304 such as a display, a SSD or other drives, wired and wireless network adapters, audio inputs and outputs, USB jacks, video inputs (e.g. webcam), printers and keyboard/mouse. Rather, access to these peripherals is controlled by a secure BIOS 306. Aspects of how secure BIOS 306 can be implemented in the present embodiments are described in co-pending application Ser. No. 14/846,768, the contents of which are incorporated herein by reference in their entirety. Those skilled in the art will appreciate how to adapt the principles of the co-pending application, as well as the afore-mentioned patents and applications, for use with the present embodiments after being taught by the examples below.

Figure 4:
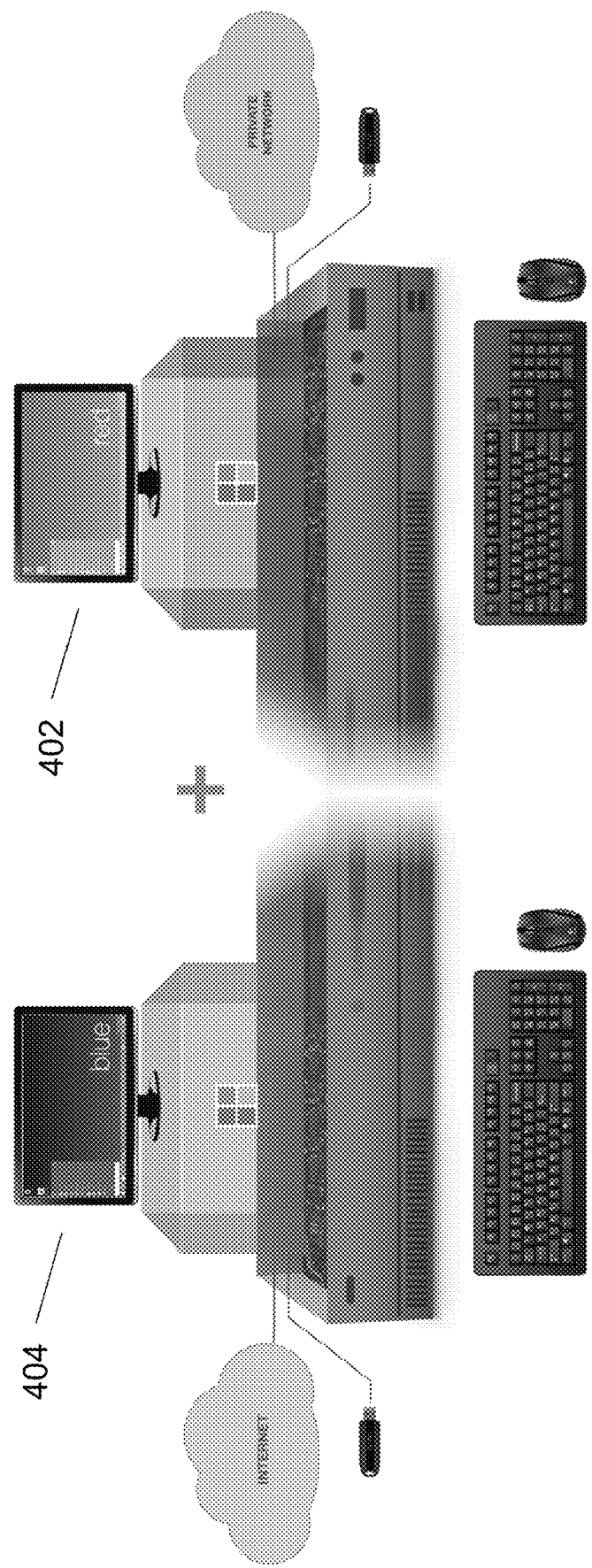
FIG. 4 is a block diagram illustrating example drawbacks of conventional computer security technology that have been recognized by the present applicant.

FIG. 4 is a block diagram illustrating example drawbacks of conventional computer security technology that have been recognized by the present applicant. As shown, in many companies, employees need at least two separate computers to perform their tasks. One computer 402, shown as running a "red" operating system, is used to perform work for which access to a company's secure private network is needed. The other computer 404, shown as running a "blue" operating system, is used to perform work for which access to a public network or the Internet is needed. Because of company concerns about the risks involved in accessing the public Internet, for example, and particularly the threat to its secure private network, the computer 402 running the "red" operating system is completely prevented from accessing the Internet. As such, a completely separate computer 404, shown running a "blue" operating system in FIG. 4, is required. For similar security concerns, the computer 404 running the "blue" operating system is prevented from accessing the company's secure private network. In some cases, the two separate computers may even be sitting on the same desk of an employee, side-by-side so that the employee may access one or the other, depending on the task to be performed.

Figure 5:
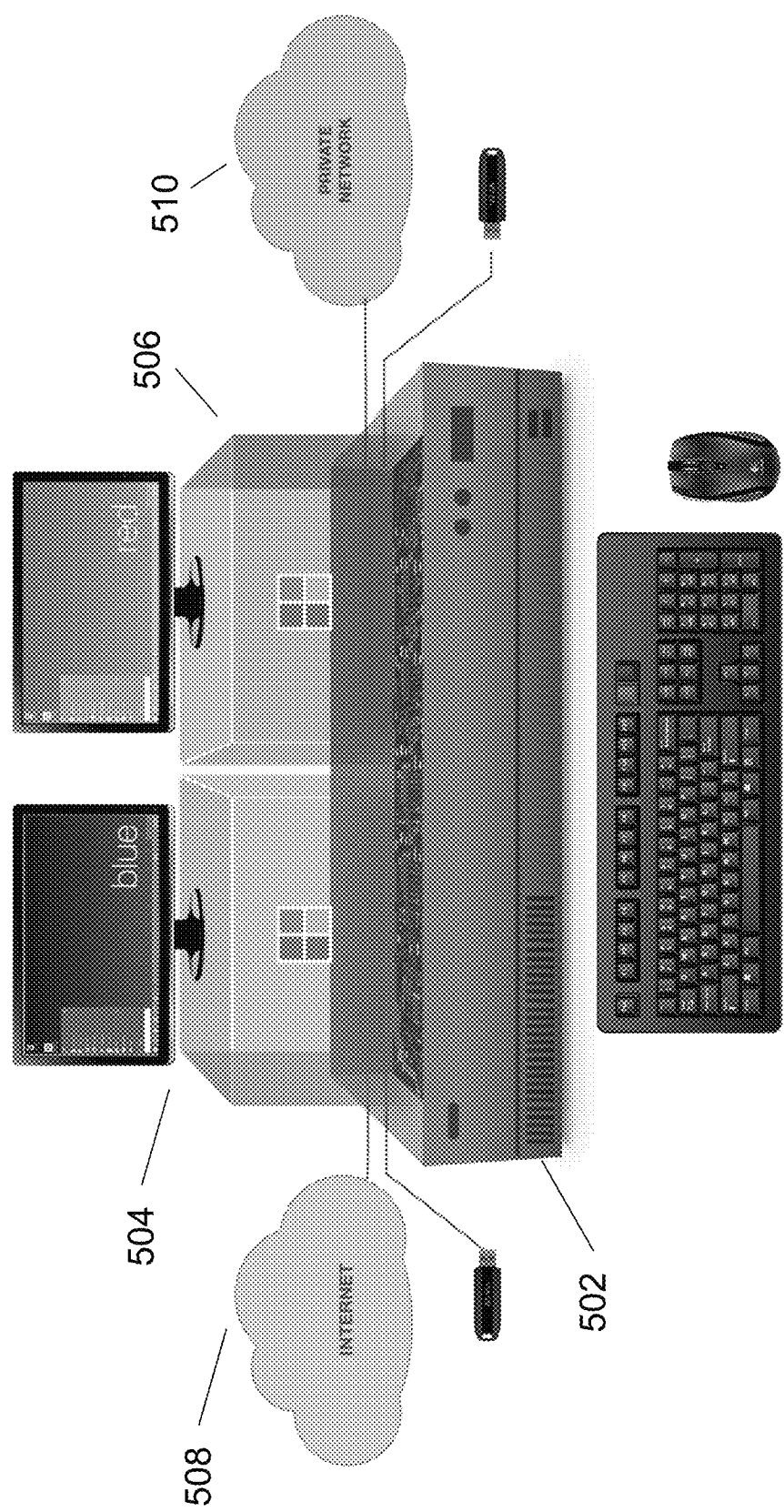
FIG. 5 is a block diagram illustrating aspects of a solution to conventional problems that are provided by the present embodiments.

FIG. 5 is a block diagram illustrating aspects of a solution to conventional problems that are provided by the present embodiments. As shown, the present embodiments allow a single computer 502 to simultaneously execute two operating systems (either two instances of the same operating system, or two different operating systems), here shown as a "blue" operating system 504 and a "red" operating system 506. According to aspects, the "blue" operating system in this example is configured to access the public Internet 508, but not the company's secure private network 510. Conversely, the "red" operating system 506 in this example is configured to access the company's secure private network 510, but not the public Internet 508, for example using firewall techniques well known to those skilled in the art.

Figure 6:
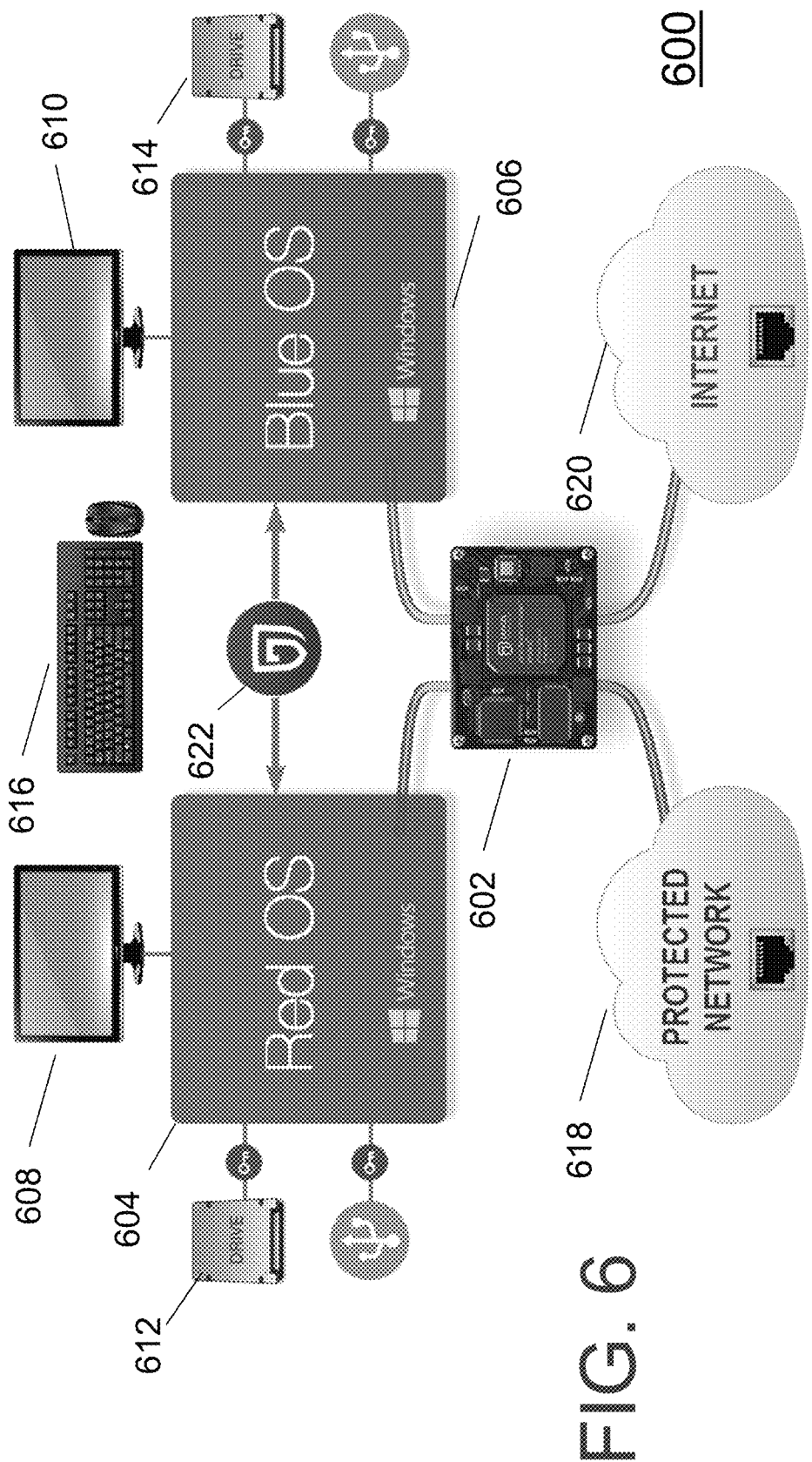
FIG. 6 is a block diagram illustrating aspects of an example secure computer according to the present embodiments.

FIG. 6 is a block diagram illustrating additional aspects of an example secure computer 600 according to the present embodiments. As shown, the secure computer 600 includes a secure SPU module 602 that configures two separate operating systems 604, 606, each providing outputs to separate displays 608, 610 and having access to separate peripherals 612, 614 such as hard drives and USB devices, that a user can simultaneously operate using a single keyboard and mouse 616. The user can select which operating system to interact with via the keyboard and mouse 616 using a shortcut key on the keyboard, for example. The secure SPU module 602 can capture the entry of this shortcut key and cause the keyboard and mouse to thereafter interact with the desired operating system 608, 610.

As further shown, one operating system, shown as the "red" operating system 604 in this example, is configured to access a protected network 618, such as a company's secure private network, and is prevented by the secure SPU module 602 from accessing the public Internet 620. The other operating system, shown as the "blue" operating system 606 in this example, is configured to access the public Internet 618, and is prevented by the secure SPU module 602 from accessing a protected network 618, such as a company's secure private network (e.g. a network behind a company's firewall, and thus protected from the public Internet). Moreover, the two operating systems are prevented from accessing the peripherals 612, 614 and displays 608, 610 of the other operating system. Although not shown, the two operating systems may be configured to run the same or similar set of applications (e.g. word processing, spreadsheets, browsers, etc.) or a different set of applications.

Due to their separate configurations, the two operating systems operate independently, without any knowledge or interaction with the other operating system. However, according to certain aspects, as shown, the secure SPU provides a secure clipboard 622 or similar mechanism to allow data to be shared between the two operating systems. For example, a user using the "blue" operating system 606 can select data to be captured, such as paragraphs of text. The user can then toggle to the "red" operating system 604 via a shortcut key that is detected by the secure SPU module 602. The secure SPU module 602 can scan the data that was captured, and perhaps perform a cleansing operation on it. The secure SPU module 602 can then give control of the keyboard and mouse 616 to the "red" operating system 604, where the user can paste the data that was captured from the "blue" operating system 606 in a desired application running under the "red" operating system 604.

Additional aspects of an example secure computer architecture according to the present embodiment will be described herein with reference to the block diagram provided in FIG. 7. As shown, the example secure computer 700 according to embodiments includes a host complex 750 and a secure complex 760.

Host complex 750 includes a host processor CPU (not shown) which comprises an x86 processor from Intel Corp. or AMD which is configured to run a "red" operating system (OS) 702 and a "blue" operating system (OS) 704. Host complex 750 further includes a platform controller hub (PCH) 706, which for example is a chipset component from Intel Corp. As will be described in more detail below, secure complex 760 configures host complex 750 to execute operating systems 702, 704 when computer system 700 first boots up, by controlling the boot process and causing the host CPU to load two different operating systems 702, 704 and separate sets of applications into program memory (e.g., DDR memory, not shown).

As further shown in the example of FIG. 7, secure complex 760 includes a BIOS interface 712, a communication channel 714, a switch 716 and a peripherals interface 718, the functionalities of which will be described in more detail below. In embodiments, some or all of secure complex 760 is implemented by as an ASIC (e.g. a JT500 secure processor from Janus Technologies, Inc.). Although not shown, such an ASIC can include a processor core running embedded software and/or operating system (e.g. Linux) and application software stored in secure memory for implementing BIOS interface 712, communication channel 714, switch 716 and peripherals interface 718, among other things.

As is known, in a conventional computer system, a host similar to host complex 750 and including a PCH such as PCH 706 includes direct connections to red and blue peripherals 728, 730 such as I/O devices and ports, graphics controllers, network interfaces, hard drives, expansion buses (e.g. PCI, PCIe), etc. According to aspects of the invention, however, host complex 750 does not have any such direct connections. Rather, some or all of them are emulated by and presented to the host complex 750 via secure complex 760, completely transparently to host complex 750 and applications running thereon. Various implementation details of how this can be done in example embodiments of the invention are described in U.S. Pat. No. 9,231,921, the contents of which are incorporated by reference herein in their entirety. Various additional details of how peripherals interface 718 can be implemented according to embodiments of the invention are described in U.S. Pat. No. 9,424,443, the contents of which are also incorporated by reference herein in their entirety. As such, further details thereof will be omitted here for sake of clarity of the invention.

As is further known, in a conventional system, a host CPU typically first boots up by accessing BIOS code. This code is typically stored in off-chip memory such as ROM or non-volatile RAM. As is known, the BIOS code includes code to initialize and test the system hardware components, and to provide an abstraction layer for the hardware, i.e., a consistent way for application programs and operating systems to interact with the keyboard, display, and other input/output (I/O) devices. Variations in the system hardware are thus hidden by the BIOS from programs that use BIOS services instead of directly accessing the hardware. In x86 example embodiments, the BIOS code can also include a management engine (ME) image.

The BIOS also includes a boot loader for loading an operating system (OS) into the CPU's program memory after successfully booting from the BIOS. Typically, the OS (e.g. Windows, Apple OS, Linux, etc.) is stored in an external mass memory device such as a hard disk drive or an internal solid state memory drive. Once the OS is loaded, a user is typically able to use the computer system to run applications via a graphical user interface (GUI) and peripherals (e.g. keyboard, mouse, etc.). These applications are also typically stored in an external or internal mass memory device and loaded by the OS into the CPU's program memory.

As in a typical computer system, the CPU and BIOS can be integrated together on the same motherboard, while the OS can be stored in an external mass memory device such as a hard disk drive as described above or also together on the motherboard as a solid state memory drive. It should be apparent that such a motherboard can include various other components such as peripheral controllers and interfaces, memory controllers, expansion buses (e.g. PCI, PCIe), program memories and the like. However, more detailed explanations of such other components will be omitted here for sake of clarity of the invention.

Figure 7:
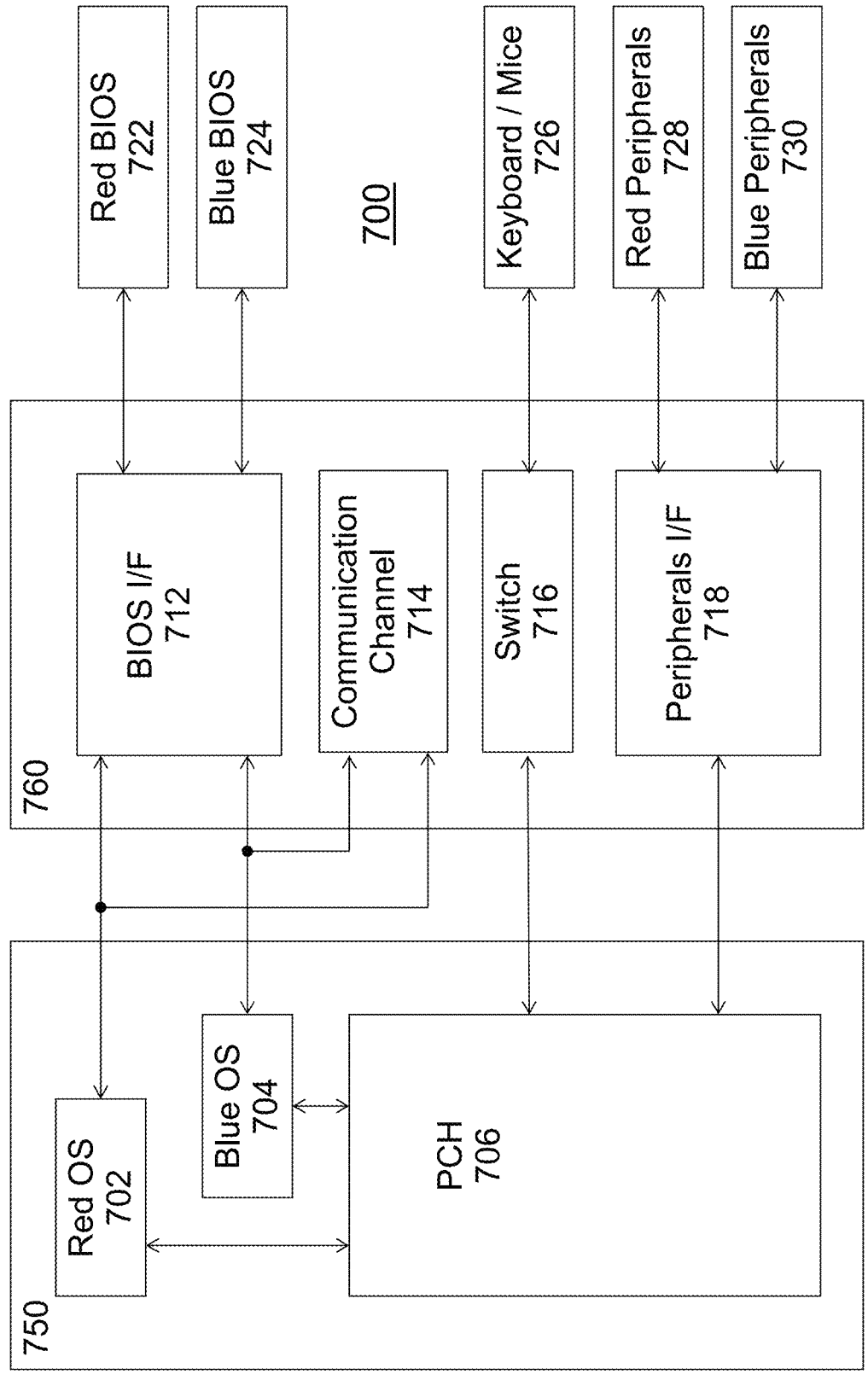
FIG. 7 is a block diagram illustrating further aspects of an example secure computer according to the present embodiments.

According to aspects of the present embodiments, as shown in FIG. 7, secure computer system 700 includes secure complex 760 that is interposed in the path between the host CPU in host complex 750 and BIOS memories 722 and 724. According to certain aspects, the configuration of secure computer system 760 allows the secure complex 760 to establish a root-of-trust path for ensuring that authenticated BIOS code is provided to the host CPU, as described in more detail in co-pending U.S. application Ser. No. 14/846,768, the contents of which are incorporated by reference herein in their entirety.

According to further aspects of the invention, the secure complex 760 stores the host complex's BIOS code 722, 724 in secure memory (not shown) and secure complex 760 has exclusive access to this secure memory. For example, where the host complex 750, secure complex 760 and the secure memory are commonly integrated on the same printed circuit board, the secure memory is electrically connected only to the secure complex 760 to the exclusion of any electrical connections to the host complex 750. In these and other embodiments, the secure complex's BIOS interface 712 emulates a standard serial peripheral interface (SPI) flash memory interface that the host CPU accesses during boot up of host complex 750.

In this use-case, the host complex 750 does not have its own SPI flash memory for storing any BIOS code. Instead, BIOS interface 712 of secure complex 760 presents a SPI interface and behaves as the BIOS storage device. Thus, when the host complex 750 boots and begins to attempt to load the BIOS image into its memory via the conventional SPI interface provided by PCH 706, it instead reads BIOS code from secure memory by the BIOS interface 712 of secure complex 760. Although FIG. 7 shows operating systems 702, 704 communicating with BIOS interface 712, they may actually communicate via PCH 706, and BIOS interface 712 can be directly connected to the SPI interface of PCH 706.

More particularly, in embodiments, the secure complex 760 controls the reset and power on/off circuitry (not shown) in system 700. Accordingly, during a system boot (e.g. when a power switch of the system 700 is turned on), the secure processor of secure complex 760 first boots up itself using its own code stored in secure memory. The BIOS interface 712 then authenticates the host BIOS code 722, 724 in secure memory. If the BIOS interface 712 determines that the BIOS code 722, 724 is secure, secure complex 760 then causes host complex 750 to be powered up and begin its boot process. In this case, the conventional SPI signals that are sent by the host CPU during its boot process are intercepted by the BIOS interface 712 in secure complex 760, and the BIOS interface 712 uses these signals to get and return the BIOS code 722, 724 from secure memory to the host complex via PCH 706.

According to multiple OS aspects of the present embodiments, in addition to or alternatively to performing BIOS memory emulation via BIOS interface 712, secure complex 760 further controls the host complex's boot process utilizing secure communications channel 714 between the host complex 750 and secure complex 760.

For example, in embodiments, BIOS code 722 and 724 include only a very preliminary boot, after which the code causes the host complex 750 to suspend further boot activity and signal as such to the secure complex 760 via communication channel 714. Those skilled in the art will understand how to modify a conventional BIOS (e.g. from Phoenix Technologies) to perform these and additional functionalities of the present embodiments as described in more detail below after being taught by the present disclosure.

In an example where secure computer 700 is configured to execute two OS's, after secure complex 760 completes its boot cycle, and after verifying the contents of BIOS code 722 and 724, it causes the host complex 750 to begin powering up using code from a first one of the two BIOS memories, for example red BIOS 722. The host complex 750 performs a preliminary boot using code 722, then suspends activity and sends a signal to secure complex 760 via communication channel 714. Secure complex 760 then configures peripherals interface 718 to provide access for red OS 702 to red peripherals 728 (e.g. one or more hard drives, network interfaces to a protected network, USB ports, etc.) and configures switch 716 to provide access for red OS 702 to keyboard and mouse 726. Secure complex 760 then signals to host complex 750 to resume booting using red BIOS code 722, whereupon host complex 750 will resume and complete its boot cycle using remaining red BIOS code 722 in secure memory.

Once booted using red BIOS code 722 according to the present embodiments, host complex 750 can proceed to load the red operating system 702 and application code from mass storage in red peripherals 728 via PCH 706 and peripherals interface 718. From the standpoint of host complex 750, this is done in the conventional manner. According to aspects of the present embodiments and related patents and applications, however, access to mass storage and other red peripherals 728 by host complex 750 is secured by peripherals interface 718 of secure complex 760. After the red OS 702 is loaded, the red BIOS code 722 executed by host complex 750 sends a signal to secure complex 760 via communication channel 714.

Upon receiving this signal, secure complex 760 causes the host complex 750 to begin executing code from the other blue BIOS 724. The host complex 750 performs a preliminary boot using code 724, then suspends activity and sends a signal to secure complex 760 via communication channel 714. Secure complex 760 then configures peripherals interface 718 to provide access for blue OS 704 to blue peripherals 730 (e.g. one or more hard drives, network interfaces to the public Internet, USB ports, etc.) and configures switch 716 to provide access for blue OS 702 to keyboard and mouse 726. Secure complex 760 then signals to host complex 750 to resume booting using blue BIOS code 724, whereupon host complex 750 will resume and complete its boot cycle using remaining blue BIOS code 724 in secure memory.

Once booted using blue BIOS code 724 according to the present embodiments, host complex 750 can proceed to load the blue operating system 704 and application code from mass storage in blue peripherals 730 via PCH 706 and peripherals interface 718. From the standpoint of host complex 750, this is done in the conventional manner. According to aspects of the present embodiments and related patents and applications, however, access to mass storage and other blue peripherals 730 by host complex 750 is secured by peripherals interface 718 of secure complex 760. After the blue OS 704 is loaded, the blue BIOS code 724 executed by host complex 750 sends a signal to host complex 760 via communication channel 714.

After both operating systems 702, 704 have been loaded, a user can use either OS, and can toggle between the two by typing a shortcut key on keyboard 726. This shortcut key is captured by switch 716, which causes the keyboard and mouse 726 to then be connected to the other OS.

Example aspects of communication channel 714 for implementing the above and other embodiments of the invention will now be described. In embodiments, communication channel 714 is implemented by a UART interface that connects the secure complex 760 and PCH 706. The UART interface can, in embodiments, run up to 115,200 baud. The UART traces may be embedded in a PCB on which both PCH 706 and secure complex 760 are commonly mounted to prevent external access to probing. It should be noted that the embodiments are not limited to this example, and the underlying physical interface for communication channel 714 may be based on a standard protocol, such as Ethernet, RS-232, USB, PCIe or a custom interface (e.g. utilizing GPIO).

As set forth above, in addition to allowing for control of the boot process, communication channel can implement a secure clipboard or similar mechanism to allow data to be shared between the two operating systems. For example, a user using the "blue" OS 704 can select data to be captured, such as paragraphs of text. The user can then toggle to the "red" OS 702 via a shortcut key that is detected by switch 716. The secure complex 760 can scan the data that was captured into the blue OS 704 clipboard, and perhaps perform a cleansing operation on it. The secure complex 760 can then give control of the keyboard and mouse 726 to the "red" OS 702, where the user can paste the data that was captured from the clipboard of the "blue" OS 704 via the communication channel 714 in a desired application running under the "red" OS 702.

Figure 8:
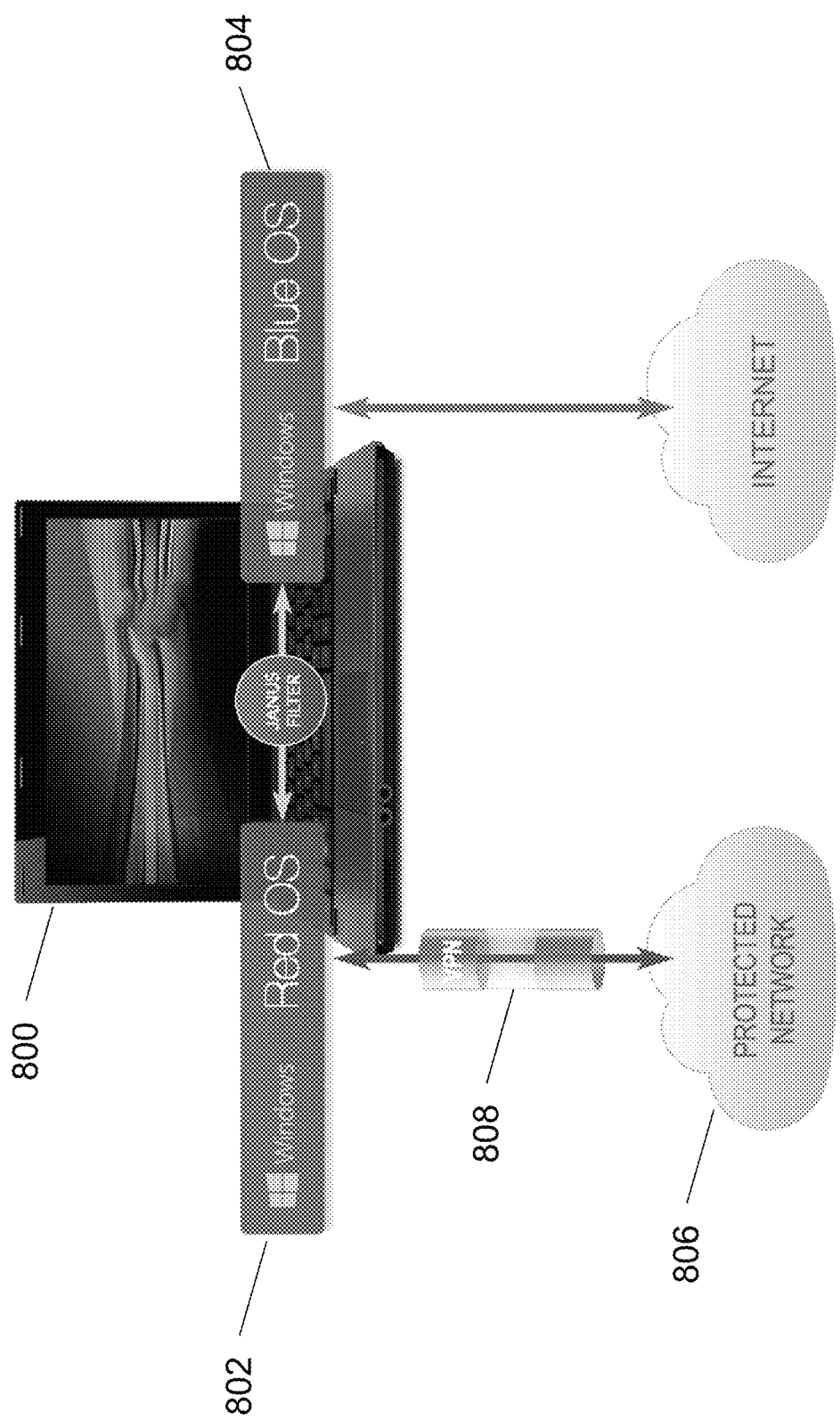
FIG. 8 is a block diagram illustrating aspects of an example secure computer in a notebook form factor according to the embodiments.

It should be noted that the principles of the invention are not limited to a desktop computer having connections to several displays and networks. Rather, the principles of the invention can be extended to use in notebook computers having only a single display and network connection. FIG. 8 is a block diagram illustrating additional aspects of a secure computer according to these and other embodiments. In this example, secure notebook computer 800 includes a secure SPU such as that described above that allows simultaneous execution of red OS 802 and blue OS 804. In these embodiments, in addition to controlling access to the keyboard of computer 800, the secure SPU also controls switching of the display between the two OS's. Moreover, the secure SPU provides access by the "red" OS 802 to a protected network 806 via a single network connection through the use of a VPN 808 that is controlled by the secure SPU, which further prevents such access by the blue OS 804.

According to certain aspects, in addition to allowing the secure computer to simultaneously execute two or more operating systems, the present embodiments can provide many additional functions and advantages.

For example, the secure SPU can monitor all the network activities of the two operating systems, such as network addresses accessed by the operating systems. It can also list these addresses in a separate display, along with a map showing the locations in the world that are associated with the addresses. Additionally or alternatively, the secure SPU can send these network addresses to a central management system, for example a network manager for an organization, and this central management system can include a display with a map showing the locations in the world that are associated with network addresses accessed by all operating systems in the organization.

As another example, the secure SPU can have its own network connection (e.g. to a secure company server) and access to its own set of video conferencing peripherals such as a display, speakers and webcam/microphone. The secure SPU can also execute its own video conferencing application for allowing the user to participate in video conferences.

As a still further example, due to the separation of access to peripherals enabled by the present embodiments, one of the operating systems can be configured to run with its own graphics accelerator, which enables high performance graphics and use of up to four different displays, for example.

Although the present embodiments have been particularly described with reference to the certain specific example embodiments thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A device incorporated in a single computer, comprising:
a host complex;
a first BIOS associated with a first operating system;
a second BIOS associated with a second operating system; and
a secure complex comprising a processor configured to control a boot sequence of, and access to the first and second BIOSes by, the host complex so as to cause the host complex to load and simultaneously execute the first and second operating systems.

2. The device of claim 1, wherein the first and second operating systems comprise two instances of the same operating systems.

3. The device of claim 1, wherein the first and second operating systems comprise two different operating systems.

4. The device of claim 1, wherein the processor of the secure complex is configured to configure the first and second operating systems to access first and second networks, respectively, the first and second networks having different levels of security.

5. The device of claim 4, wherein the first network is the public Internet and wherein the second network is a protected network that is secured from the public Internet by a firewall.

6. The device of claim 1, wherein the single computer includes a keyboard, and wherein the processor of the secure complex is configured to configure only one of the first and second operating systems to communicate with the keyboard at a time.

7. The device of claim 6, wherein the processor of the secure complex is configured to switch access to the keyboard by the first and second operating systems in response to a shortcut key typed on the keyboard.

8. The device of claim 1, wherein the single computer includes first and second sets of peripherals, and wherein the processor of the secure complex is configured to configure the first and second operating systems to access the first and second sets of peripherals, respectively, and also configured to prevent the first and second operating systems to access the second and first sets of peripherals, respectively.

9. The device of claim 8, wherein the first and second sets of peripherals include one or more of a hard drive, a display, a graphics adapter, a network interface and a USB port.

10. The device of claim 1, wherein the processor of the secure complex is configured to cause the first and second operating systems to boot from the first and second BIOSes, respectively.

11. A method of operating a single computer, the single computer comprising first and second BIOSes respectively associated with first and second operating systems, the method comprising:
configuring a processor of a secure complex of the single computer to exclusively control the ability of a host complex to load or execute any operating systems; and
controlling, by the configured processor of the secure complex, a boot sequence of, and access to the first and second BIOSes by, the host complex so as to cause the host complex to load and simultaneously execute the first and second operating systems.

12. The method of claim 11, wherein the first and second operating systems comprise two instances of the same operating systems.

13. The method of claim 11, wherein the first and second operating systems comprise two different operating systems.

14. The method of claim 11, further comprising:
configuring, by the configured processor of the secure complex, the first and second operating systems to access first and second networks, respectively, the first and second networks having different levels of security.

15. The method of claim 14, wherein the first network is the public Internet and wherein the second network is a protected network that is secured from the public Internet by a firewall.

16. The method of claim 11, wherein the single computer includes a keyboard, the method further comprising:
configuring, by the configured processor of the secure complex, only one of the first and second operating systems to communicate with the keyboard at a time.

17. The method of claim 16, further comprising:
switching, by the configured processor of the secure complex, access to the keyboard by the first and second operating systems in response to a shortcut key typed on the keyboard.

18. The method of claim 11, wherein the single computer includes first and second sets of peripherals, the method further comprising:

configuring, by the configured processor of the secure complex, the first and second operating systems to access the first and second sets of peripherals, respectively; and preventing, by the configured processor of the secure complex, the first and second operating systems to access the second and first sets of peripherals, respectively.

19. The method of claim 18, wherein the first and second sets of peripherals include one or more of a hard drive, a display, a graphics adapter, a network interface and a USB port.

20. The method of claim 11, further comprising:

causing, by the configured processor of the secure complex, the first and second operating systems to boot from the first and second BIOSes, respectively.

\* \* \* \* \*